United States Patent [19]

Dickson

[11] 4,004,207

[45] Jan. 18, 1977

[54] ROTARY SWITCH

[75] Inventor: Vernon E. Dickson, Toronto, Canada

[73] Assignee: Sangamo Electric Company, Springfield, Ill.

[22] Filed: Feb. 7, 1975

[21] Appl. No.: 547,864

[52] U.S. Cl. ............................ 318/695; 200/11 R; 200/8 R; 200/164 R; 200/38 C; 200/63 R

[51] Int. Cl.[2] ........................................ G05B 11/12

[58] Field of Search ......... 318/695; 200/8 R, 11 G, 200/24, 11 R, 164, 164 A, 63, 38 C, 38 CA, 38 BA

[56] References Cited

UNITED STATES PATENTS

| | | | |
|---|---|---|---|
| 1,737,807 | 12/1929 | Sengebusch | 200/8 R X |
| 2,286,406 | 6/1942 | Green et al. | 318/695 X |
| 3,028,530 | 4/1962 | Gaureau et al. | 318/695 |
| 3,239,734 | 3/1966 | Levy | 318/695 X |
| 3,363,159 | 1/1968 | Bollhoefer | 318/695 |
| 3,518,389 | 6/1970 | Doering, Jr. et al. | 200/11 G |
| 3,652,812 | 3/1972 | Ristuccia | 200/8 R |

*Primary Examiner*—B. Dobeck
*Attorney, Agent, or Firm*—Johnson, Dienner, Emrich & Wagner

[57] ABSTRACT

A multiple contact rotary switch comprises a rotatable staff to which an armature is electrically and physically mounted. A plurality of pins is spaced equi-radially away from the staff and around the staff, and the armature is arranged to move past each of the pins in turn as the staff rotates. The armature is flexible and spring-like, so that it maintains contact with any one pin for as long as it can, then springs forwardly to contact the next pin. A low power SPDT switch is thereby provided. The switch may operate extremely slowly, with no switch contact dead-break or teasing.

9 Claims, 5 Drawing Figures

ROTARY SWITCH

FIELD OF THE INVENTION

This invention relates to a rotary switch, particularly a multiple contact rotary switch which can be operated very slowly and which has no dead-break or teasing. The multiple contact rotary switch of this invention is especially adapted for use as a single-pole, double-throw switch in low power installations. The rotary switch of this invention is also relevant to a remote reading meter register, where the rotary switch comprises the means by which stepping signals are transmitted to a remote reading meter register from an active register.

BACKGROUND OF THE INVENTION

Recently, there has developed a demand for remote meter register installations, where the meter register is mounted in some different place than the meter whose reading is registered. Such demand has come for a variety of reasons, including inaccessibility of the meter location for readings to be taken from the meter register, for reasons of appearance of uniformity of installation, so as to cluster a plurality of meters — eg. electricity, water or gas meter registers — from a plurality of apartments or other users in a single reading station, etc. In fields such as domestic users of electricity, water or gas for example, the rate of use may be very low, and the rate of rotation of even the lowest reading dial on a meter register may be extremely slow. When the drive of the lower reading dial on a meter register is totally mechanical, as in the basic meter where the meter may be driven from a disc, gear train or otherwise, the actual rate of drive can be compensated by using accurately cut gears, properly mounted in good bearings. However, in any remote meter register, there is not usually a direct mechanical drive for that register. Rather, the remote reading register is often electrically connected to the basic meter, and its lowest reading dial may be driven in step-fashion, one dial division at a time, at the same rate as the lowest reading dial on the basic meter. Thus, it may very often be desirable to provide a remote reading meter register which can be driven in step fashion at the same rate of meter divisions per unit time as the basic meter whose reading it registers.

In a meter such as an electric watt-hour meter, the driving torque which drives the lowest reading dial on the meter register of such meter is usually very low, and the driving rate may be very slow. In the usual circumstance where a remote reading meter register is electrically connected to the meter, the remote reading meter register is made to operate and to register the meter reading by driving the lowest reading dial on the remote register in a stepwise fashion. In other words, each time the lowest reading dial on the meter passes through another dial division, a signal is sent from the meter to the remote reading meter register to step the lowest reading dial on the remote register another dial division. Thus, the remote reading dial is never more than slightly less than one dial division of its lowest reading dial from accurately registering the reading on the transmitter or basic meter. It has been usual to provide a switching arrangement in the transmitting meter, associated with the lowest reading dial, to send reverse polarity DC pulses to the remote reading meter register each time the dial pointer on the transmitting meter passes through one dial division. The switch means which are usually mounted with the transmitting meter are low power, short throw switches requiring a minimum of driving torque; and they are electrically connected with a DC source to send DC signals whose polarity reverses in each subsequent dial position, so as to drive a stepping motor which is associated with the lowest reading dial of the remote reading register.

It has been found, however, that at very low driving speeds of the lowest reading dial, conventional switches are not suitable because they exhibit dead-break or teasing characteristics. In a conventional switch which requires a snap-action or over-centre action to cause the switch to change its throw position, when the plunger is moving very slowly, there is a time period when one contact of the switch lets go from its co-operating contact but does not yet move away from its immediate area. There is, therefore, a non-contact immediately before the switch plunger reaches the operating point during its own operation. Such non-contact is detrimental to the life and electrical performance of the switch, particularly because when there is a very thin insulating boundary of air between the two contacts, arcing may occur between them, even at very low voltages. Further, during the period of non-contact — which because of the non-operating characteristic of the very slow moving switch plunger is known as a "dead-break" of the spring action of the switch — there may be a possibility that the switch continuously tries to reclose or otherwise vibrates in the non-contact area or band, and such action is known as "teasing". For example, in the sort of switch which is known commercially as a "micro-switch," where a plunger travels 0.001 inches in 8 hours — as it might have to do in very low consumption use where the switch is mechanically connected to the lowest reading dial of a meter register — and where the switch has a dead-break of 0.00005 inches, it would take 24 minutes for the switch plunger to travel through the dead-break. During that time, considerable teasing may occur, with consequent damage to the contacts of the switch.

Thus, it is desirable to provide a "tease-proof" switch which can be operated at very low driving torque and which has no dead-break. Such a switch is, as noted, particularly useful in such systems having remote reading meter registers for watt-hour, gas or water consumption registrations; and may also be useful in clock movements or other rotary, remotely driven or pulsed registration systems. The present invention provides a rotary multiple contact switch which can be particularly adapted as a single-pole, double-throw switch and easily mounted behind the lowest reading dial of a conventional meter register for electrical connection with a remote reading register, either directly or indirectly through an interface of telephone lines, radio transmission, etc. The rotary switch which is provided by this invention particularly includes a rotary staff — which is the staff on which the dial pointer of the lowest reading dial of the transmitting meter is also mounted — and to which is physically and electrically secured an electrically conductive, flexible and elongated armature. The armature is mounted to rotate with the staff, and as it rotates it sweeps an area surrounding the staff. Near the outer boundary of the area which the armature sweeps there is mounted a plurality of pins which are electrically insulated one from another, but which may be electrically connected by back connections into two or more groups of pins so as to provide the appropriate switch action. In particular, a plurality of pins can be mounted radially spaced from the rotating staff having two groups which are electrically connected, every second one of the pins in one group and the intervening pins in the other group, to provide the double-throw action of the rotary switch, as described hereafter. The single-pole switch is, of course, provided by the electrical connection from the staff to any one of the pins, and the armature is mounted so as to contact only one pin at a time, as discussed in greater detail hereafter.

The armature of the multiple contact rotary switch according to this invention is, as noted, electrically conductive and flexible. Essentially, the armature is formed of a sheet of suitable material such as berylium copper alloy, or other conductive and flexible material having spring characteristics. As the armature rotates with the staff and sweeps an area around the staff, the outer end of the armature contacts, seriatim, the pins which are radially spaced from the staff. The length of the armature is such that only one pin is contacted at any one time; and the spring characteristic of the material is such as to assure that there is no dead-break in the rotary switch of the present invention, even if its rotary speed is extremely slow.

In the preferred embodiment of the present invention, the armature of the switch is bifurcated at its outer end to have two sections of unequal length. The width of each of the two sections of unequal length may be equal, or they may be unequal. The length of the shorter of the two sections of the bifurcated end of the armature is such as to assure contact of that shorter section with any one of the pins as the armature rotates. During that action, at some time the shorter of the two sections of the bifurcated outer end of the armature loses contact with the pin across which it is wiping an electrical contact, and when that happens the shorter section of the bifurcated outer end of the armature tends to straighten out because of the spring characteristic of the material from which the armature is formed. In so doing, the shorter section of the bifurcated end of the armature thereby springs forward in the rotative direction of the armature, and that action forces the longer of the two sections to lose contact with the pin and also to spring forward to contact the next pin. Thus, a wiping action across the pin is assured, and at the same time there is no dead-break because the spring action of the armature itself assures that once the shorter section of the bifurcated end of the armature has lost contact with a pin with which it was formerly in contact, the longer section is also forced to lose contact and to move forward to make contact with the next pin.

In an alternative embodiment, the armature comprises a single arm which is arranged to wipe across each pin in turn, and which has suitable spring characteristics to assure that the outer end of the arm moves forward to contact the next pin when it loses contact with any pin.

At very low rotative speeds of the switch, the outer end or ends of the armature may move in minute but discrete movements across any pin, in wiping contact therewith. Thus, as the switch shaft rotates very slowly, the armature — which, as noted, is a light spring — may hold in frictional contact with the pin for a period of time, and then move across the pin a very short distance under spring force so as to normalize its position. Several such discrete movements may occur before the armature, or one portion of a bifurcated armature, loses contact with the pin and the armature moves forward to the next pin. In any event, there is no teasing because there is no plunger action, and therefore there is no physical placing of the switch components in a position where a dead-break could occur. Also, the spring characteristic of the armature is such as to assure contact of the outer end of the armature in the forward direction of the rotation thereof with one of the pins with which it is intended to contact.

BRIEF SUMMARY OF THE INVENTION

This invention therefore provides a rotary, multiple contact switch which is essentially tease-proof and which has no dead-break, and which can therefore be operated at extremely low rotative speeds and with very low driving torgue.

The invention further provides a multiple contact rotary switch which is adapted to be connected as a single-pole, double-throw switch.

In a preferred embodiment, the invention provides a means using the single-pole, double-throw, mulitple contact rotary switch in a master or transmitting meter register to drive a remote reading meter register so that the remote reading register duplicates the reading of the transmitter register.

BRIEF DESCRIPTION OF THE DRAWINGS

These and other features and objects of the invention are more fully discussed hereafter, in association with the accompanying drawings, in which.

DESCRIPTION OF THE PREFERRED EMBODIMENTS

Figure 1:
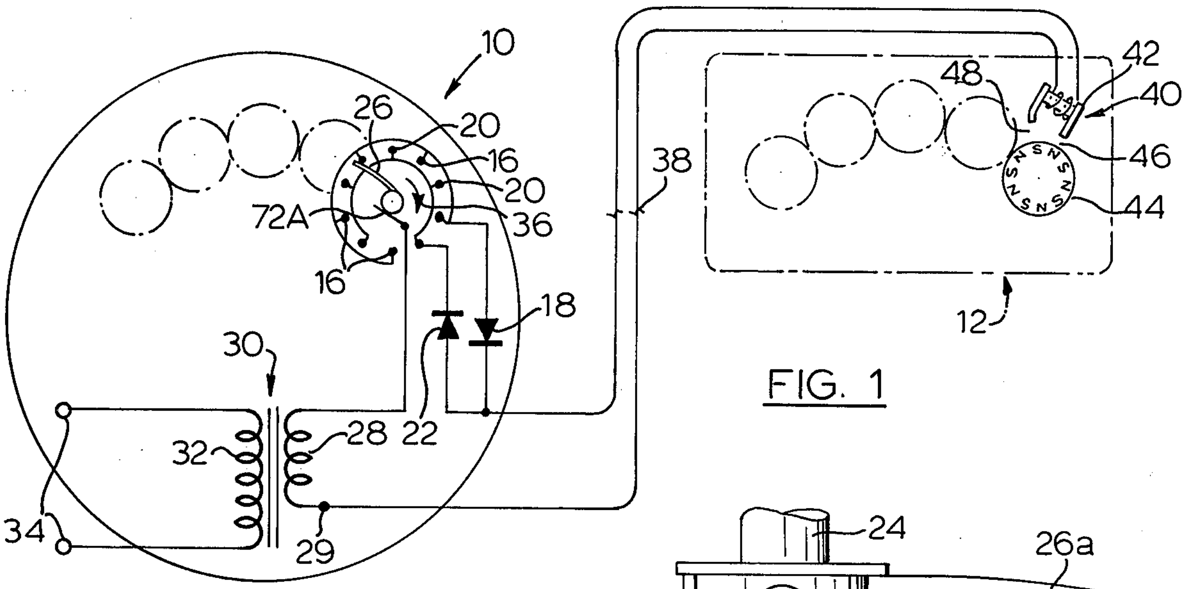
FIG. 1 is a schematic diagram showing the connection between a master or transmitter meter register and a remote reading meter register, utilizing the multiple contact rotary switch of this invention.

Referring first to FIG. 1, a master or transmitting meter is indicated generally at 10, and a remote reading meter register is indicated generally at 12. Each of the meter registers may conveniently be a four or five dial register, such as a watt-hour register; or they may be meter registers for gas or water meters, as well as clock movements and other such devices where a stepwise rotary movement of one register is to be duplicated at a remote reading register.

A multiple contact rotary switch is indicated generally at 14 in the transmitting register 10, and it comprises a first group of pins 16 which are electrically connected to a diode 18, and a second group of pins 20 which are electrically connected to a diode 22. A rotatable staff 24 has an armature 26 connected thereto, for rotation and contact, seriatim, with one pin 16 or one pin 20, alternatively. Thus, as armature 26 moves from contact with a pin 16 to a pin 20, and then to a second pin 16, and so on, its operation is that of a single-pole, double-throw, multiple contact rotary switch. The staff 24 is electrically connected to the secondary winding 28 of a transformer 30, having primary winding 32 across a source of electrical energy 34. The connection of the secondary winding 28 and the pair of oppositely facing diodes 18 and 22 is such that the output between the connected sides of the diodes 18 and 22 and point 29 of secondary winding 28 is, at any time, a half-wave rectified direct current; and as the rotary switch 14 and the armature 26 thereof rotate in direction of arrow 36, the output from the connected sides of oppositely facing pair of diodes 18 and 22 is alternately reversed in polarity.

It will be noted that there is a two-wire connection from transmitting meter register 10 to the remote reading meter register 12; and the connection between them may be through an interface indicated generally at 38, which may be telephone lines, radio transmission, or a solid connection between the meter registers. In any event, it will be noted that the two-wire output from the meter register 10 — which is taken from the connected sides of the oppositely facing diodes 18 and 22, and point 29 of secondary winding 28 — is connected to a stepping motor 40 having stator 42 which is electrically connected to the two-wire output of transmitting meter register 10, and a rotor 44. The rotor 44 may be a cylindrical permanent ceramic magnet having an extremely high coercive force, and having a plurality of magnetic poles of alternating polarity around its circumference. In the usual case, the number of magnetic poles is ten because the number of pins 16 and 20 is ten, which inturn is the number of dial divisions of the lowest reading meter dial of the meter register. In other circumstances, the number of dial divisions may be 12, 60, or any other number. In any event, the stator 42 of the stepping motor 40 has an operating coil wound thereon, and it is set to span approximately one and one-half poles of the rotor 44. Unequal air gaps 46 and 48 between the poles of the stator 42 and the rotor 44 provide a biassing effect which assures magnetic "locking" of the rotor, and so as to provide a forward advancement of the rotor when the pulse polarity of the half-wave DC output from the transmitting meter 10 across the operating coil of the stator 42 is reversed. The stepping motor 40 may also be replaced with a solid-state pulse accumulator.

As the armature 26 of rotary switch 14 moves from one of pins 16 to one of pins 20, for example, the output connection from the rotary switch 14 changes so that the single pole of the switch is disconnected from diode 18 and connected to diode 22. Since the single-pole, double-throw switch is connected across the secondary winding 28 of transformer 30, and in series with the oppositely facing pair of diodes 18 and 22, the output is therefore a half-wave rectified DC whose polarity reverses every time the armature 26 moves from one of pins 16 to one of pins 20 or vice versa. Thus, after a connection is made either to diode 18 or diode 22, the first positive going pulse or negative going pulse from secondary winding 28 passes through the diode and causes stepping motor 40 to setp to its next position. Of course, all subsequent positive or negative going pulses pass through the diode 18 or 22, whichever is connected and depending on the polarity thereof, but the stepping motor 40 will not again step until a pulse of the reverse polarity is received by it, because of the relative positions of the stator poles and of the rotor pole being spanned thereby.

Turning now to FIGS. 2, 3, 4 and 5, a detailed description of the rotary switch of this invention follows. A dial plate 50 having a dial 52 and a dial pointer 54 is shown, and is of the sort such as may be found in a watt-hour meter register. The dial is the lowest reading dial of the meter register, because all of the higher reading dials are driven, in turn by the lowest reading dial in the well known fashion. The dial pointer 54 is mounted on a staff 24, on which is also mounted a register gear wheel 56 which is driven at its edge by a drive gear 58 connected to the driving means of the meter. As noted, the meter may be a watt-hour meter, a gas or water meter, etc.

Figure 2:
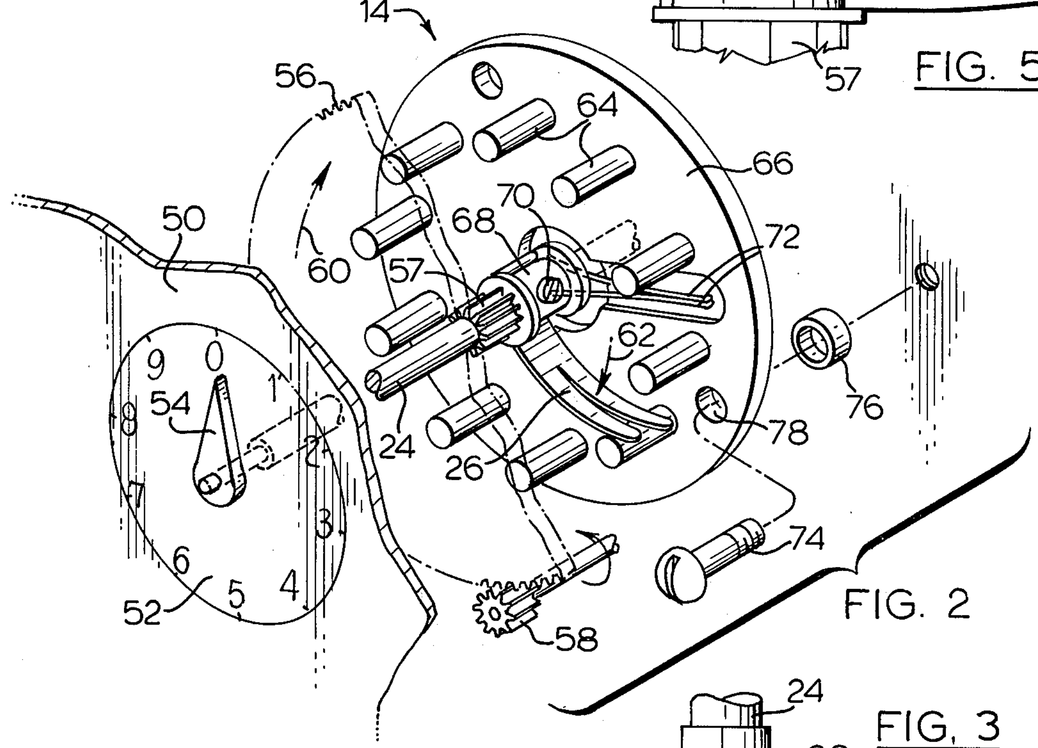
FIG. 2 is an exploded, perspective view, partially cut away, showing a multiple contact rotary switch according to this invention installed in a meter register.
Figure 4:
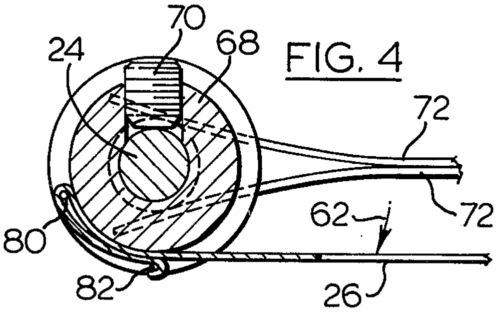
FIG. 4 is a cross-section looking in the direction of arrows 4—4 of FIG. 3.

Also mounted on the staff 24 is an armature 26, which is physically and electrically secured to the staff 24 for rotation therewith as shown by the arrows 60 and 62 of FIG. 2. A plurality of pins 64 are mounted on an insulating backplate 66, so that each of pins 64 is electrically insulated one from another. The electrical connection between alternate pins so as to make up the sets of pins 16 and 20 as discussed above with reference to FIG. 1 may conveniently be made on the back side of insulating back plate 66. The armature 26 is secured to the staff 24 by collar 68 and set screw 70, as discussed hereafter. An electrical connection to the staff 24 which acts as the common connection to the double-throw switch may be made such as by a pair of wires 72 having a spring characteristic which forces them into contact with the staff 24 which rotates between them. The wires 72 are schematically shown in FIG. 1 at 72A. The back plate 66, and thus the rotary switch 14, may conveniently be mounted to the body of the meter 10 using bolts 74 and spacer 76, through holes 78 in the back plate 66.

The armature 26 may, as noted, be formed of a suitable material having a spring characteristic, such as an alloy of berylium and copper. Such material has a high conductivity, and is particularly suited as a wiping switch contact material in a low current, low voltage rotary switch of the type contemplated by this invention. The armature 26 may be attached to the staff 24 by collar 68 having a pair of pins 80 and 82, thereby assuring a positive physical and electrical connection between the armature 26 and the staff 24. The direction of rotation of the armature 26 is shown in each of FIGS. 2 and 4 at arrow 62.

Figure 3:
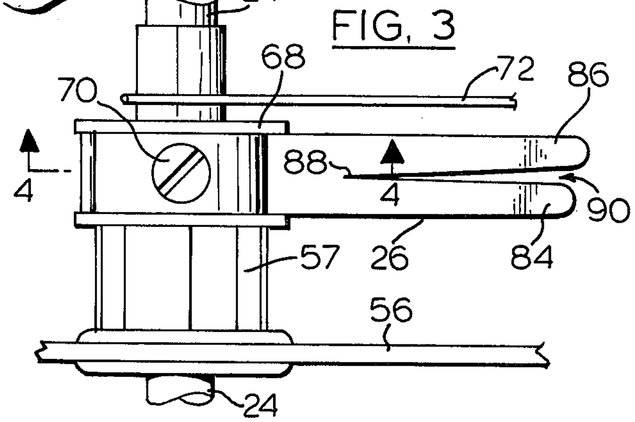
FIG. 3 is a view of a portion of the staff and an armature of a rotary switch according to this invention.

Referring now to FIG. 3, the preferred embodiment of the armature 26 has a bifurcated outer end, having a shorter section 84 and a longer section 86. The width of each of the bifurcated sections 84 and 86 of armature 26 may be approximately equal one to the other. The relative difference between the lengths of sections 84 and 86 is a function of the active length of the armature 26 — that is, as the free length of the armature between the staff 24 and any one of the pins 64 when the armature first contacts the pin increases, section 86 can become proportionately longer than section 84. In any event, it is noted that the sections 84 and 86 are longer than the diameter of a pin 64, and that the end 88 of the split 90 between the bifurcated sections 84 and 86 is closer to the staff 24 than any portion of any of the pins 64.

It will be noted that as the armature rotates in the direction indicated by arrow 62, no matter how slowly, there will come an instant in time when the underside of the shorter section 84 is no longer in wiping contact with a pin 64, even though the underside of section 86 remains in contact with the pin 64 at that same instant in time. At that moment, because of the spring characteristic of the material of the armature 26, the section 84 attempts to straighten, thereby advancing rapidly away from the pin with which it has just left contact. In so doing, the section 86 is also snapped forward from contact with the previous pin into contact with the next adjacent pin in the direction of rotation of the armature 26. Thus, there is no dead-break, because once the section 84 loses contact with the pin it must snap forward and take the section 86 with it to contact the next pin, there being no plunger action, and an almost instantaneous recontacting of the armature with the next pin. It will also be noted that, because the armature 26 is secured over pins 80 and 82 to the side of collar 68 fitted over staff 24, the inner end of the armature is leading with respect to the back side of any pin 64 which is next to be contacted by the outer end of the armature. Thus, once contact is made with any pin by the armature as it snaps forward, the contact is retained because of the spring nature of the material of the armature 26, and no teasing of the armature 26 on the pin 64 occurs.

Figure 5:
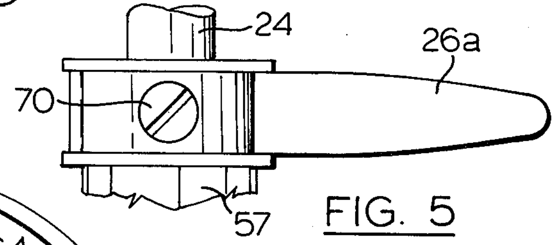
FIG. 5 is a partial view, similar to FIG. 3, of an alternative armature according to this invention.

An alternative embodiment of the armature is shown in FIG. 5 at 26*a*, and includes a single arm which is secured to the staff 24 in the same manner as the armature 26. The armature 26*a* has suitable spring characteristics so that it also is driven to snap forward from one pin to the next as the staff 24 rotates. Either of the armatures 26 or 26*a* is secured to the staff 24 on the side thereof which tends to cause the armature to wrap around the staff as it is held by any one pin and as the staff rotates in its forward direction. As noted previously, the armature 26 or 26*a* may move across a pin in very minute, discrete motions until such time that its own spring force acts to snap the armature forwardly to contact with the next pin.

It has been noted that the material of the armature 26 may be made of an alloy of berylium and copper; although other conductive materials having suitable spring properties may also be used. In addition, in order to prevent corrosion, the armature or at least the underside thereof which contacts the pin 64 with a wiping contact may be plated with such materials as rhodium or gold. It should also be noted that the cross-section of the outer end of the section 86 of the end of bifurcated armature 26 must be chosen so that when only the longer section 86 of the armature remains in contact with any pin 64, the force of that contact is not sufficiently great as to go beyond the yield point of the material of the armature at the contact point. The same conditions apply to the outer end of armature 26*a*. In other words, the width and thickness of the armature are chosen so that the yield point or fatigue limit of the material of the armature at the contact point thereof with a pin 64 is higher than the resolution of any spring forces acting through the armature at that point.

It is also noted, because of the inherent nature of the design of the rotary switch contemplated by this invention, there is a substantially constant wiping action between the armature and the pin which it is contacting at any time. A wiping action between contacts in any switch is desirable so as to keep the contacts clean and free from dust or other debris which might either disturb the switch action or cause burning or pitting of the contacts as electrical connection is made or broken between them. It will also be noted that use of the bifurcated armature 26 precludes the possibility of a relatively high current point contact between the armature 26 and any pin 64, because of the spring action to snap the armature into contact with the next adjacent pin 64 after section 84 of the armature loses contact with a pin; and in any event, the armature 26 or 26*a* acts as a forwardly biassed light coil spring.

It will be noted that if there is a power outage, thereby de-energizing secondary winding 28 of transformer 30, and the stepping motor 40 of remote reading register 12, there is no false count on the remote register 12 when power is restored. This is because the armature of the rotary switch 14 will remain stationary, and the electrical connection to one or the other of diodes 18 and 22 also remains constant. As mentioned, the stepping motor 40 will only drive forward on a pulse of the reverse polarity to the ones being received, because of the permanent magnets in rotor 44.

It can also be seen that a switch having an armature of either embodiment taught by this invention could have a reciprocating motion, particularly when the driving action is very slow, and still preclude the dead-break and teasing action inherent in plunger operated switches. Still further, it is seen that any number of dial divisions of a rotary dial associated with a rotary switch in accordance with this invention may be remotely duplicated; but the number of dial divisions should be an even number if a permanent magnet type of stepping motor is to be used in the remote register.

Other modifications and changes to a switch or a remote reading register system incorporating a switch in accordance with this invention may be made without departing from the spirit and scope of the appended claims.

I claim:

1. A multiple contact rotary switch comprising a rotatable staff having an electrically conductive, flexible and elongated armature physically and electrically secured thereto for rotation therewith so as to sweep an area surrounding said staff, and a plurality of pins radially spaced from said rotatable staff and positioned near the outer boundary of said swept area so as to be contacted, seriatim, by the outer end of said armature remote from said staff as said staff and armature rotate, the length of said armature being at least equal to the distance from the point where it is attached to said staff to any one of said pins so that the outer end of said armature makes a wiping contact with only one pin at a time, and said outer end of said armature being bifurcated, and having two sections of unequal length with the length of both sections being sufficient to assure contact thereof with any one of said pins, and to permit the shorter section to be moved out of contact with a given pin while said longer section remains in contact with said given pin, the movement of said shorter section out of contact with said given pin causing the longer section to lose contact with said given pin, permitting said outer end of said armature to move into contact with a further one of said pins.

2. A multiple contact rotary switch comprising a rotatable staff having an electrically conductive, flexible and elongated armature physically and electrically secured thereto for rotation therewith so as to sweep an area surrounding said staff, and an even number of pins radially spaced from said rotatable staff and positioned near the outer boundary of said swept area so as to be contacted, seriatim, by the outer end of said armature remote from said staff as said staff and armature rotate, the length of said armature being at least equal to the distance from the point where it is attached to said staff to any one of said pins, so that said armature makes a wiping contact with only one pin at a time, every second one of said pins being electrically connected to each other in a first group of pins and the intervening pins being electrically connected to each other in a second group of pins which is electrically insulated from said first group of pins, so that said first and second groups of pins together with said rotatable staff and said armature form a multiple contact, single-pole, double-throw switch.

3. The rotary switch of claim 1 where said two sections at said bifurcated outer end of said armature are longer than the diameter of a pin, and the end of the split between the bifurcated sections is closer to the staff than any portion of any one of said pins.

4. The multiple contact rotary switch of claim 3 where said armature is formed of an alloy of berylium and copper.

5. The rotary switch of claim 2 where each of said first and second groups of pins is electrically attached to one side of one of first and second oppositely facing diodes, the other side of said first and second diodes being connected together to provide first and second signal paths as said armature rotates and contacts, seriatim, pins of one or the other of said first and second groups of pins, respectively.

6. In a remote reading meter register system, a first meter register and a second, remote reading meter register electrically connected to said first register and adapted to indicate the registration thereof, said remote reading meter register including a stepping motor adapted to advance said remote reading meter register when pulses of alternating polarity are impressed across said motor from said first register, said first register including a driven, rotatable, single-pole, double-throw, multiple contact switch electrically connected in series between a power source and rectifier means, and operable to provide pulses of alternating polarity for said stepping motor, said rotatable single-pole, double-throw, multiple contact switch having a rotatable staff, an electrically conductive, flexible and elongated armature physically and electrically secured thereto for rotation therewith so as to sweep an area surrounding said staff, and an even number of pins radially spaced from said rotatable staff and positioned near the outer boundary of said swept area so as to be contacted, seriatim, by the outer end of said armature remote from said staff as said staff and armature rotate, the length of said armature being at least equal to the distance from the point where it is attached to said staff to any one of said pins so that said armature makes a wiping contact with only one pin at a time, every second one of said pins being electrically connected to each other in a first group of pins and the intervening pins being electrically connected to each other in a second group of pins which is electrically insulated from said first group of pins.

7. The apparatus of claim 6 where said outer end of said armature is bifurcated, and has two sections of unequal length, the length of both sections being sufficient to assure contact thereof with any one of said pins, and to permit the shorter section to be moved out of contact with a given pin while said longer section remains in contact with said given pin, the movement of said shorter section out of engagement with said given pin causing the longer section to lose contact with said given pin permitting said outer end of said armature to move into contact with a further one of said pins.

8. The apparatus of claim 7 where said two sections at said bifurcated outer end of said armature are longer than the diameter of a pin, and the end of the split between the bifurcated sections is closer to the staff than any portion of any one of said pins.

9. The apparatus of claim 8 where said rectifier means includes a pair of oppositely facing diodes, each of said first and second group of pins being electrically attached to one side of one of said pair of said diodes, the other side of said pair of diodes being connected together to provide first and second signal paths as said armature rotates and contacts, seriatim, pins of one or the other of said first and second groups of pins, respectively.

* * * * *